United States Patent
Tanaka et al.

(10) Patent No.: US 9,878,684 B2
(45) Date of Patent: Jan. 30, 2018

(54) COATED FABRIC AND METHOD FOR PRODUCING SAME

(71) Applicant: TORAY Industries, Inc., Tokyo (JP)

(72) Inventors: Nobuaki Tanaka, Otsu (JP); Hiroshi Tsuchikura, Otsu (JP); Satoshi Yamada, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 340 days.

(21) Appl. No.: 14/419,627

(22) PCT Filed: Aug. 26, 2013

(86) PCT No.: PCT/JP2013/072730
§ 371 (c)(1),
(2) Date: Feb. 4, 2015

(87) PCT Pub. No.: WO2014/034604
PCT Pub. Date: Mar. 6, 2014

(65) Prior Publication Data
US 2015/0210240 A1    Jul. 30, 2015

(30) Foreign Application Priority Data

Aug. 28, 2012   (JP) ................. 2012-187387
Jan. 21, 2013   (JP) ................. 2013-008221

(51) Int. Cl.
*B60R 21/235*   (2006.01)
*D03D 1/02*     (2006.01)
(Continued)

(52) U.S. Cl.
CPC .............. *B60R 21/235* (2013.01); *B05D 7/00* (2013.01); *D03D 1/02* (2013.01); *D03D 11/00* (2013.01);
(Continued)

(58) Field of Classification Search
CPC ............ B05D 7/00; B60R 2021/23514; B60R 2021/23533; B60R 21/235; D03D 11/00;
(Continued)

(56) References Cited

U.S. PATENT DOCUMENTS 5,846,604 A    12/1998   Caldwell
5,865,464 A *  2/1999   Kanuma ................. D03D 1/02
                                            280/743.1

(Continued)

FOREIGN PATENT DOCUMENTS

EP    0866164 A1    9/1998
EP    1770191 A1    4/2007
(Continued)

OTHER PUBLICATIONS

Extended European Search Report for European Application No. 13833877.7, dated Apr. 15, 2016.
(Continued)

*Primary Examiner* — Arti Singh-Pandey
(74) *Attorney, Agent, or Firm* — Birch, Stewart, Kolasch & Birch, LLP

(57) ABSTRACT

The present invention addresses the problem of providing a cloth which, when used as an air bag main body cloth, does not undergo the damage caused by a high-temperature gas generated from an inflater, and therefore has high heat resistance and is suitable for an air bag. The means for solving the problem is a coated cloth for an air bag, which is produced by applying an elastomer resin layer on at least one surface of a three-dimensional woven fabric in an amount of 50 to 500 g/m² per one surface, said coated cloth being characterized by having void spaces formed therein, wherein the void content in the coated cloth is 15 to 60%. Preferably, the coated cloth is used in applications in which
(Continued)

the coated cloth is attached onto the periphery of an inflater connection opening in an air bag.

8 Claims, 2 Drawing Sheets

(51) Int. Cl.
*D03D 11/00* (2006.01)
*D06M 15/643* (2006.01)
*B05D 7/00* (2006.01)
*D06N 3/00* (2006.01)
*D06N 3/12* (2006.01)
*D06M 101/34* (2006.01)

(52) U.S. Cl.
CPC ........ *D06M 15/643* (2013.01); *D06N 3/0006* (2013.01); *D06N 3/128* (2013.01); *B60R 2021/23514* (2013.01); *B60R 2021/23533* (2013.01); *D06M 2101/34* (2013.01); *D06M 2200/30* (2013.01); *D06N 2203/066* (2013.01); *D06N 2205/20* (2013.01); *D06N 2211/268* (2013.01); *D06N 2213/02* (2013.01); *Y10T 442/3065* (2015.04); *Y10T 442/3203* (2015.04)

(58) Field of Classification Search
CPC ................ D03D 1/02; D06M 2101/34; D06M 2200/30; Y10T 442/3065; Y10T 442/3203
See application file for complete search history.

(56) References Cited

U.S. PATENT DOCUMENTS

| | | | |
|---|---|---|---|
| 2002/0130503 A1* | 9/2002 | Matsui | B60R 21/235 280/743.1 |
| 2003/0040238 A1* | 2/2003 | Li | B29D 11/00615 442/76 |
| 2005/0244596 A1* | 11/2005 | Schindzielorz | D06N 3/128 428/34.1 |
| 2007/0007756 A1* | 1/2007 | Okuno | B60R 21/235 280/743.1 |
| 2008/0001385 A1* | 1/2008 | Konishi | B60R 21/2346 280/730.2 |
| 2008/0042414 A1* | 2/2008 | Nagaoka | B60R 21/235 280/743.1 |
| 2010/0253047 A1 | 10/2010 | Youn et al. | |
| 2013/0147170 A1* | 6/2013 | Tanaka | B60R 21/235 280/743.1 |

FOREIGN PATENT DOCUMENTS

| | | |
|---|---|---|
| JP | 5-78946 A | 3/1993 |
| JP | 2949842 B2 | 9/1999 |
| JP | 2000-326811 A | 11/2000 |
| JP | 2004-268880 A | 9/2004 |
| JP | 2008-144309 A | 6/2008 |
| JP | 2009-29138 A | 2/2009 |
| JP | 2011-508828 A | 3/2011 |
| WO | WO 2005/108671 A2 | 11/2005 |

OTHER PUBLICATIONS

International Search Report issued in PCT/JP2013/072730, dated Oct. 29, 2013.

* cited by examiner

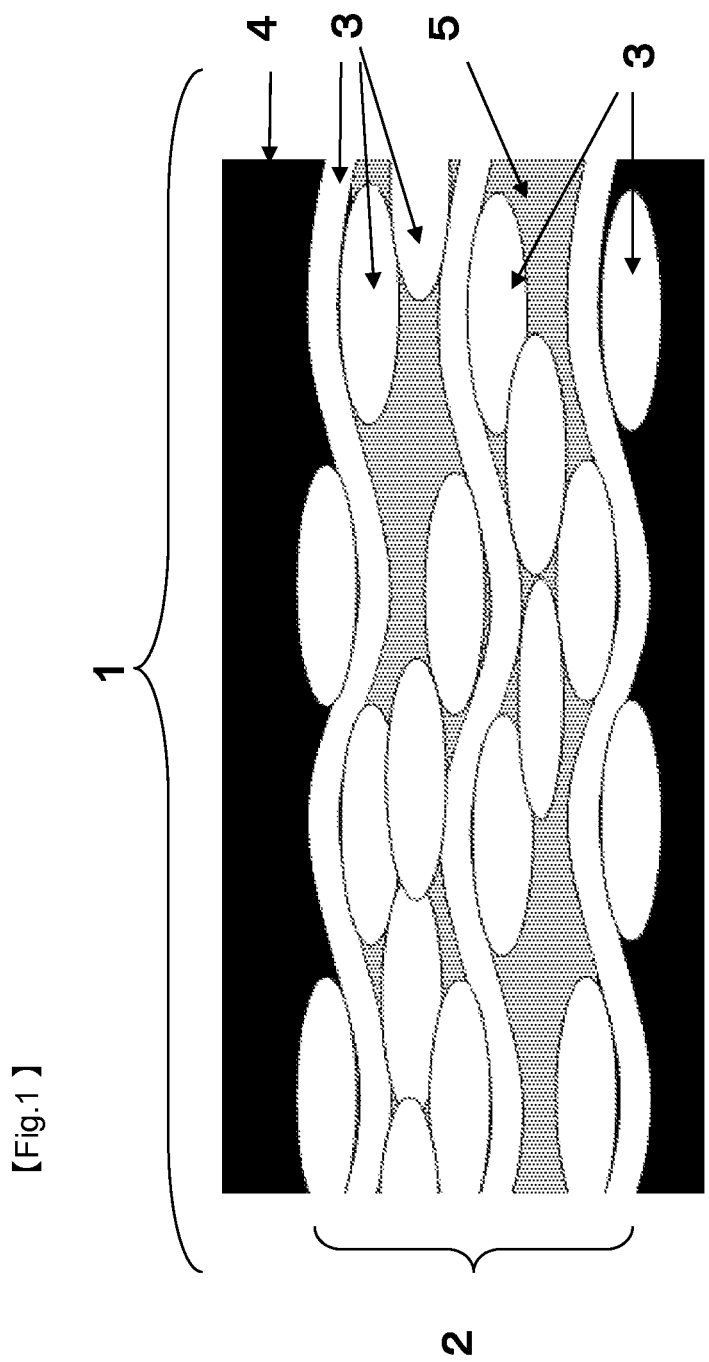
[Fig.1]

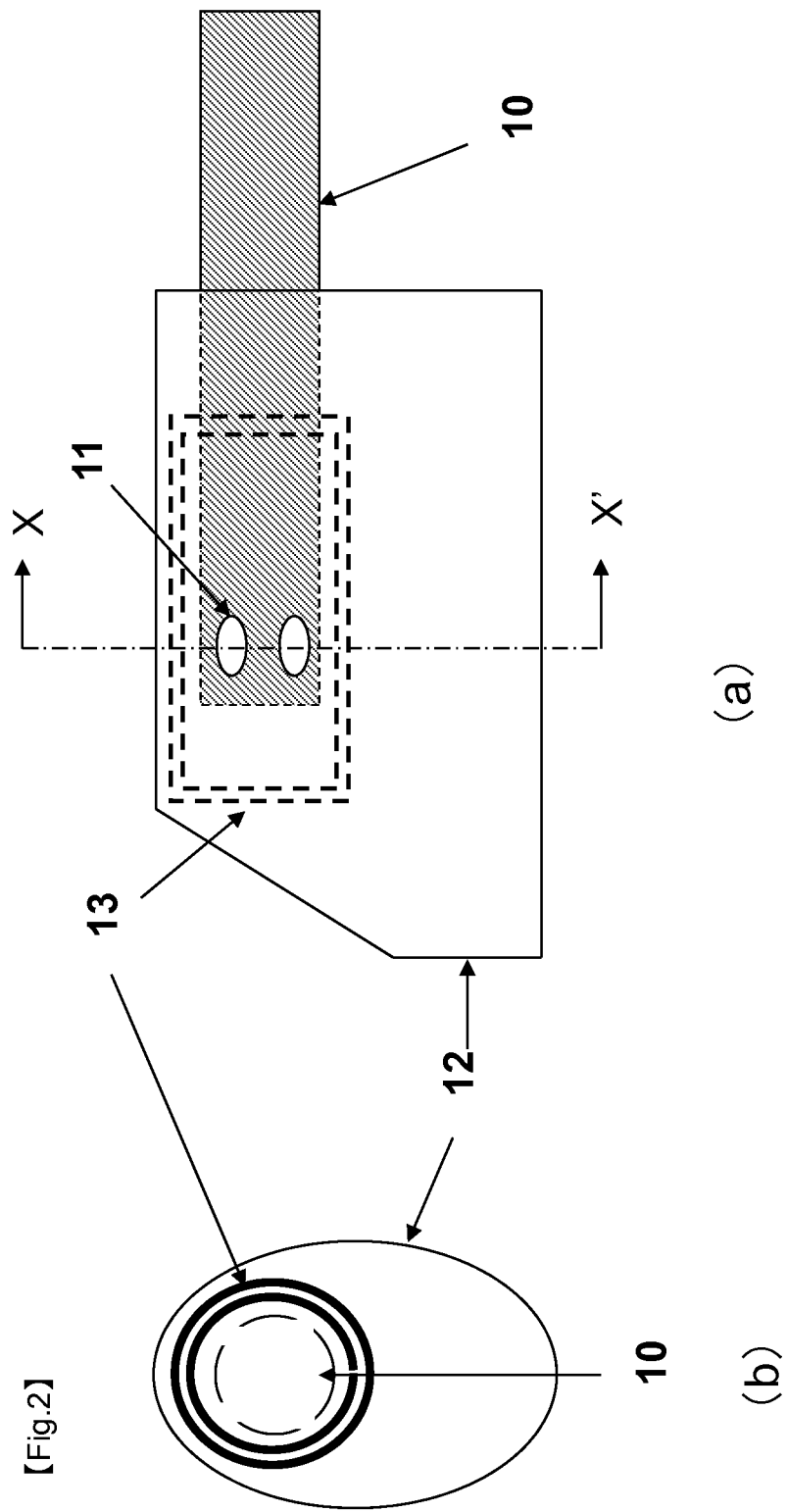

US 9,878,684 B2

COATED FABRIC AND METHOD FOR PRODUCING SAME

TECHNICAL FIELD

The present invention relates to a coated fabric suitable for air-bags. In particular, the present invention relates to a fabric useful for protecting the periphery of an opening, which is for connection with an inflator, in an air-bag main body.

BACKGROUND ART

An air-bag device is a device to protect automobile occupants in the case of a collision of the automobile by inflating the air-bag instantly. The air-bag device usually includes: an inflator serving as a gas generator; and an air-bag made of a synthetic fabric designed to inflate with an inflator gas. The gas ejected from the inflator is very hot. Therefore, the periphery of an inflator connection opening, with which the hot gas makes direct contact, is treated to increase its heat resistance.

For example, there has been proposed a base fabric for an air-bag in the form of a bag, whose inlet for an inflator gas has increased heat resistance because a part of the air-bag for connection with the inflator is partially coated with a thick resin (Patent Document 1). However, this technique is to apply a light coating of resin to the entire surface of the base fabric and thereafter apply the second coating to a necessary part, and thus has a problem in that the coating has to be performed a plurality of times and this leads to increased costs.

On the other hand, there has been proposed an air-bag in which, for the purpose of increasing the heat resistance of its inner periphery of an inflator connection opening, a base fabric for an air-bag main body and a flame-resistant fabric are arranged and a layer of a heat insulating resin resistant to temperatures up to at least 250° C. is provided between the base fabric and the flame-resistant fabric (Patent Document 2). However, the inflator gas currently used is becoming hotter and hotter, and the temperature at the moment of explosion may be 2000° C. or higher. Therefore, usual heat-resistant resins cannot withstand such a hot gas.

Furthermore, there has been proposed a method by which a reinforcing fabric or the like is polymerized on the periphery of an opening for connection with an inflator and the fabric is sewed on the periphery (Patent Document 3). This technique is to stack two reinforcing fabrics on the base fabric for an air-bag main body. However, the structure of the reinforcing fabric itself is not disclosed, and it is unknown whether the reinforcing fabric itself can withstand the high temperatures of the inflator gas currently used.

PRIOR ART DOCUMENTS

Patent Documents

Patent Document 1: Japanese Patent Laid-open Publication No. 2007-261380

Patent Document 2: Japanese Patent Laid-open Publication No. 2004-114981

Patent Document 3: Japanese Patent Laid-open Publication No. H8-225048

SUMMARY OF THE INVENTION

Problems to be Solved by the Invention

An object of the present invention is to provide a highly heat-resistant fabric that can reduce damage to a base fabric for an air-bag main body from a hot gas generated from an inflator.

Solutions to the Problems

The present inventors have made a consideration in order to attain the above object and, as a result, found that it is possible to attain the object with the use of a three dimensional construction woven fabric. Specifically, the present invention includes the following configurations.

(1) A coated fabric including a three dimensional construction woven fabric, wherein: at least one surface of the three dimensional construction woven fabric is coated with an elastomer resin layer, an amount of the elastomer resin layer being 50 to 500 g/m$^2$ per one surface; and the coated fabric has a void therein and has a void content of 15 to 60%, (2) the coated fabric which is for attachment to a periphery of an inflator connection opening in an air-bag, (3) either of the above coated fabrics, wherein: fibers constituting the three dimensional construction woven fabric are synthetic fibers; and the fibers have a total fineness of 100 to 700 dtex and a single yarn fineness of 1 to 7 dtex, (4) any of the above coated fabrics, wherein: both surfaces of the three dimensional construction woven fabric are each coated with the elastomer resin layer; and the amount of the elastomer resin layer attached to one of the both surfaces is equal to or less than 200 g/m$^2$, (5) any of the above coated fabrics, wherein the three dimensional construction woven fabric has a thickness of 0.5 to 2.5 mm, (6) a method for producing any of the above coated fabrics, including: producing a three dimensional construction woven fabric from synthetic fibers with a jacquard loom or a dobby loom; and coating at least one surface of the three dimensional construction woven fabric with an elastomer resin, and (7) an air-bag including any of the above coated fabrics, wherein the coated fabric is sewed to a part for attachment to a periphery of an opening for connection with an inflator of an air-bag device.

Effects of the Invention

The present invention provides a coated fabric that can withstand a hot gas and that is suitable for air-bags.

BRIEF DESCRIPTION OF THE DRAWINGS

FIG. 1 schematically illustrates a cross section of a coated fabric of the present invention.

FIG. 2 schematically illustrates a configuration of an inflation test. FIG. 2(a) is a front view, and FIG. 2(b) is a cross-sectional view taken along line X-X' of FIG. 2(a).

EMBODIMENTS OF THE INVENTION

A coated fabric of the present invention includes, as a basic structure, a three dimensional construction woven fabric woven from fibers. The coated fabric is structured as illustrated in, for example, FIG. 1. FIG. 1 is a cross-sectional view of one example of a coated fabric 1. A three dimensional construction woven fabric 2 illustrated in FIG. 1 is a three-layer woven fabric, and is constituted of a plurality of fibers 3. The three dimensional construction woven fabric 2 is coated with an elastomer resin constituting an elastomer resin layer 4. In a space between the fibers, or, in some cases, in a space enclosed by the fibers and resin, there is a void 5 having an appropriate volume.

Examples of the material for the fibers constituting the three dimensional construction woven fabric include synthetic fibers such as polyamide fibers, polyester fibers, aramid fibers, rayon fibers, polysulfone fibers, and ultra-high-molecular-weight polyethylene fibers. Of these, polyamide fibers and polyester fibers are preferable because of their excellent mass-producibility and economic efficiency.

Examples of polyamide fibers include fibers made from: nylon 6; nylon 66; nylon 12; nylon 46; copolyamides of nylon 6 and nylon 66; copolyamides obtained by copolymerizing nylon 6 with a polyalkylene glycol, a dicarboxylic acid, an amine, or the like; or the like. Nylon 6 fibers and nylon 66 fibers are preferable because of their particularly excellent shock resistance.

Examples of polyester fibers include fibers made from polyethylene terephthalate, polybutylene terephthalate, or the like. Fibers made from copolyesters obtained by copolymerizing polyethylene terephthalate or polybutylene terephthalate with isophthalic acid, 5-sodium sulfoisophthalic acid, or an aliphatic dicarboxylic acid such as adipic acid, which serves as an acid component, may also be used.

Synthetic fibers may also contain one or more additives such as a heat stabilizer, an antioxidant, a photostabilizer, a lubricating agent, an antistatic agent, a plasticizer, a thickener, a pigment, and/or a flame retardant, for higher productivity in a spinning and drawing step and a processing step or for better properties.

Warp and weft yarns of the three dimensional construction woven fabric of the present invention are preferably synthetic fibers of the same chemical structure. It is also preferable that the warp and weft yarns have the same total fineness and that the warp and weft yarns have the same single fiber fineness.

"Polymers of the same kind" mean polymers having a common main repeating unit, such as nylon 66 polymers and polyethylene terephthalate polymers. For example, a combination of a homopolymer and a copolymer is also acceptable as polymers of the same kind in the present invention. Furthermore, if the polymers equally have, or equally do not have, the same kind of copolymer component in the same amount, such polymers are preferable also in terms of production management because the warp and weft yarns do not have to be handled as different yarns.

Furthermore, "the warp and weft yarns have the same total fineness or the same single fiber fineness" means that the difference between total finenesses or the difference between single fiber finenesses is within 5% of the smaller one of the finenesses of the warp and weft yarns.

The synthetic fibers for use in the present invention preferably have a total fineness of 100 to 700 dtex. Synthetic fibers having a total fineness of 100 dtex or greater are capable of keeping the strength of a woven fabric. In the case where the synthetic fibers have a small total fineness, the synthetic fibers have a low rigidity and therefore are prone to bend when forming a three dimensional construction woven fabric. Such synthetic fibers cannot keep voids and tend not to increase the void content. Synthetic fibers having a total fineness of 700 dtex or smaller are capable of keeping more suitable flexibility during storage and keeping a desirable void content. The total fineness is more preferably 300 to 650 dtex, even more preferably 400 to 600 dtex. The synthetic fibers having a total fineness within this range make it possible to achieve balanced improvements in strength, flexibility and void content of a woven fabric.

The synthetic fibers are preferably synthetic fiber filaments having a relatively small single fiber fineness of 1 to 7 dtex. This is because a single fiber fineness of 1 dtex or greater makes it possible to produce synthetic fiber filaments without special arrangements, and a single fiber fineness of 7 dtex or smaller improves the flexibility of synthetic fiber filaments. The single fiber fineness is more preferably 2 to 6.8 dtex, even more, preferably 3 to 6.6 dtex. Setting the single fiber fineness within the above-described low range is preferable, because it is possible to bring about the effect of reducing the rigidity of synthetic fiber filaments and thus improve the flexibility of a base fabric.

The tensile strength of each of the single fibers constituting a coated fabric for an air-bag of the present invention is, for the purpose of satisfying the mechanical properties required of a woven fabric for an air-bag and in view of spinning operation, preferably 8.0 to 9.0 cN/dtex, more preferably 8.3 to 8.7 cN/dtex for both the warp and weft yarns.

The coated fabric of the present invention has a void in a woven fabric. The percentage of the void is preferably 15 to 60%.

It should be noted here that the void content can be calculated from the following equation.

Void content(%)=(Apparent mass−Actual mass)/Actual mass×100

Specifically, first, the thickness of an uncoated base fabric and the thickness of a coated base fabric are found. The difference between the thicknesses of the uncoated base fabric and the coated base fabric is used as the thickness of a resin. The volume of the uncoated base fabric and the volume of the resin layer are found from a test piece, and the apparent mass is found from the density of fibers constituting the base fabric and the density of the resin which coats the base fabric. The apparent mass is calculated from the following equation.

Apparent mass (g)=Thickness of uncoated base fabric (cm)×Area of test piece ($cm^2$)×Density of original yarn ($g/cm^3$)+(Thickness of coated base fabric (cm)−Thickness of uncoated base fabric (cm))×Area of test piece ($cm^2$)×Density of resin ($g/cm^3$)

Then, the void content is calculated from the obtained apparent mass and actual mass.

In the case where the apparent mass is calculated using only the coated base fabric without using the properties of the uncoated base fabric, the following method can be used. The thickness of the uncoated base fabric is found in the following manner: a photograph of a cross section of the coated base fabric is taken with a scanning electron microscope, and the thickness of a base fabric portion, which is a three dimensional construction woven fabric, and the thickness of a resin portion are found. The density of the original yarn is found by picking out a fiber with no resin attached. The density of the resin is found by dissolving the original yarn in a solvent that dissolves the original yarn but does not dissolve the resin and using the remaining resin. An example of a solvent that dissolves nylon 66 is formic acid, and an example of a solvent that dissolves polyethylene terephthalate is hexafluoroisopropanol. In the case where the density of a material is unknown and the density is desired to be found, the density can be found by method A (water replacement method), method B (pycnometer method), method C (sink-float method), or method D (density gradient tube method) of JIS K7112 (1999).

Usually, test pieces in the form of a square measuring 20 cm×20 cm are taken out from five positions and measured, and the mean of the void contents calculated using the test pieces is used.

The coated fabric having a void content within the above range brings about the heat insulation effect and thus improves heat resistance. The coated fabric having a low void content cannot bring about a sufficient heat insulation effect, and the coated fabric having a high void content cannot keep the thickness as a fabric and has a tendency to have a crushed woven fabric structure. Therefore, the void content is more preferably 20% or higher, whereas the upper limit of the void content is 60% or lower, preferably 40% or lower.

In the coated fabric of the present invention, at least one surface of a woven fabric needs to be coated with an elastomer resin layer. This makes it possible to protect the woven fabric from a hot gas generated from an inflator.

The elastomer resin for coating the woven fabric is preferably a heat-resistant, cold-resistant, and flame-resistant resin. Examples of the elastomer resin include silicone resins, polyamide resins, polyurethane resins, and fluororesins. Of these, silicone resins are particularly preferable in view of heat resistance and low air permeability. Examples of the silicone resins include dimethyl silicone resins, methylvinyl silicone resins, methylphenyl silicone resins, and fluoro silicone resins.

Furthermore, it is also preferable that the resin for coating the woven fabric contain a flame-resistant compound. Examples of the flame-resistant compound include: halogenated compounds containing bromine, chlorine, or the like; platinum compounds; antimony oxide; copper oxide; titanium oxide; phosphorus compounds; thiourea compounds; carbon; cerium; and silicon oxide. Of these, halogenated compounds, in particular halogenated cycloalkanes, platinum compounds, copper oxide, titanium oxide, and carbon are more preferable.

The amount of the resin for coating the woven fabric, which is applied to one surface of the woven fabric, is 50 to 500 $g/m^2$. The upper limit is preferably 400 $g/m^2$ or less, more preferably 300 $g/m^2$ or less, even more preferably 250 $g/m^2$ or less. The lower limit is preferably 100 $g/m^2$ or more. An amount of the resin within this range makes it possible to achieve both the heat resistance and flexibility of the coated fabric for an air-bag. In the case where the amount of the resin attached to the surface is 50 $g/m^2$ or more, it is possible to cover the surface of the woven fabric in a uniform manner and to achieve heat resistance and good followability to a connection part.

The other surface of the three dimensional construction woven fabric does not have to be coated. Note, however, that the other surface is also preferably coated for improved heat resistance. The thickness is 500 $g/m^2$ or less, more preferably 200 $g/m^2$ or less, even more preferably 100 $g/m^2$ or less. The lower limit is preferably 50 $g/m^2$ or more. In the case where the amount of the resin attached to the other surface is equal to or smaller than the above-described level, it is possible to improve heat resistance and flexibility. In the case where the amount of the resin attached to the other surface is equal to or more than the above-described range, the resin covers the surface of the woven fabric in a uniform manner, and it is possible to improve heat resistance and achieve flexibility and possible to enhance the heat insulation effect brought about by the void formed inside the three dimensional construction woven fabric.

The coated fabric of the present invention preferably has a thickness of 0.5 to 2.5 mm, more preferably 0.7 to 2.3 mm, even more preferably 0.9 to 2.0 mm. The coated fabric having a thickness within the above range makes it possible to achieve both the heat resistance and flexibility required of a coated fabric for an air-bag.

In the following, a method for producing a three, dimensional construction woven fabric of the present invention and a method for producing a coated fabric of the present invention will be described.

A three dimensional construction woven fabric of the present invention Means a woven fabric that has fibers on its front surface and, in addition, in the woven fabric and/or on the other surface of the woven fabric, fibers running along the same direction as those on the front surface.

The woven fabric is woven after its structure is designed so that the woven fabric will be a multilayer woven fabric.

The multilayer woven fabric is categorized into a three-layer woven fabric, a four-layer woven fabric, five-layer woven fabric, a six-layer woven fabric, and the like. A two-layer woven fabric cannot easily provide a necessary void content, and a five-layer woven fabric and a six-layer woven fabric require a larger amount of original yarns and this leads to increased costs. Therefore, of the above-listed woven fabrics, a three-layer woven fabric and a four-layer woven fabric are preferable.

First, a warp yarn made from any of the foregoing materials and having any of the foregoing total finenesses is warped and put on a loom. A weft yarn is prepared in the same manner. Since the three dimensional construction woven fabric is a multilayer woven fabric, the loom used may be a jacquard loom or a dobby loom. In view of versatility, the three dimensional construction woven fabric is preferably woven, with a dobby loom. In terms of weft yarn insertion, the loom may be, for example, a water-jet loom, an air-jet loom, or a rapier loom.

After the weaving step, if needed, the woven fabric is subjected to processes such as scouring and heat setting.

A coated fabric of the present invention is obtained by applying a resin to at least one surface of the three dimensional construction woven fabric.

The resin may be applied with the use of a roll comma coater, a floating knife coater, a roll-on-knife coater, a reverse roll coater, a gravure roll coater, or the like. In the case where a thick layer of resin is to be applied, a roll comma coater is preferable. In the case where a thin layer of resin is to be applied, a floating knife coater is preferably used.

The coated fabric described here can be produced very easily, and therefore has a cost advantage. Furthermore, the coated fabric has excellent heat resistance while keeping good mechanical properties specific to a three dimensional structure. In view of this, the coated fabric is suitable for use in air-bags, and even more suitable for use in a part that is to be attached to the periphery of an opening, which is for connection with an inflator, in an air-bag.

EXAMPLES

In the following, the present invention will be described more specifically with reference to examples. It should be noted that, in the present invention, the effects of the invention were evaluated by evaluating the heat resistance of coated fabrics with the use of an inflator. This test is referred to as an inflation test. The method for performing the inflation test will be described later. Furthermore, the obtained coated fabrics were measured and evaluated by the following methods.

[Methods of Measurement]

(1) Woven Fabric Thickness

Using a thickness gauge, the thickness was measured in accordance with JIS L 1096:1999 8.5 in the following manner: a pressure of 23.5 kPa was applied to a sample and, after the sample was left for 10 seconds to settle the thickness, the thickness was measured at each of five different positions of the sample, and the mean was calculated.

(2) Basis Weight

The basis weight was measured in accordance with JIS L 1096:1999 8.4.2 by taking three test pieces of 20 cm×20 cm and measuring the mass (g) of each of the test pieces. The mean of the masses was represented as a mass per 1 m$^2$ (g/m$^2$).

(3) Amount of Attached Resin

A comparative sample, which was prepared in the same manner except that no resin was applied, was measured.

The basis weight of the comparative sample was measured in accordance with the section (2), and the difference between the basis weight of the coated fabric and the basis weight of the comparative sample was found as the amount of an attached elastomer resin (unit: g/m$^2$).

(4) Density

The density of an original yarn was measured in accordance with JIS Z 8807, and the density of a resin to be used was measured in accordance with JIS K 6249.

(5) Void Content

The thickness of an uncoated base fabric and the thickness of a coated base fabric were found in accordance with the section (1). The difference between the thicknesses of the uncoated base fabric and the coated base fabric was used as the thickness of a resin. The Volume of the uncoated base fabric and the volume of the resin layer were found from a test piece, and the apparent mass was found from the density of the original yarn and the density of the resin. It should be noted that the test piece used in this example was in the shape of a square measuring 20 cm×20 cm.

Apparent mass (g)=Thickness of uncoated base fabric (cm)×Area of test piece (cm$^2$)×Density of original yarn (g/cm$^3$)+(Thickness of coated base fabric (cm)−Thickness of uncoated base fabric (cm))×Area of test piece (cm$^2$)×Density of resin (g/cm$^3$)

The actual mass of the coated base fabric was found in accordance with the section (2), and the value obtained from the following equation was used as a void content.

Void content (%)=(Apparent mass−Actual mass)/ Actual mass×100

It should be noted that the density of a nylon 66 fiber used in the present invention was 1.14 g/cm$^3$, the density of a polyethylene terephthalate fiber used in the present invention was 1.38 g/cm$^3$ and the density of a silicone resin used in the present invention was 1.07 g/cm$^3$.

[Test Method]

(1) Inflation Test

FIG. 2 conceptually illustrates a method for an inflation test. FIG. 2 (a) is a front view conceptually illustrating the test method, and FIG. 2 (b) is a cross-sectional view taken along line X-X'. Two coated fabrics 13 of the present invention were stacked together on the periphery of an exit gas port 11 of a fabric 12 for an air-bag main body, the inflator was ignited, and the coated fabrics and the fabric for an air-bag main body were checked for damage.

It should be noted that the fabric for an air-bag main body has the following configuration.

Warp and weft yarns used were twistless synthetic fiber filaments which are constituted of 136 nylon 66 filaments having a circular cross section and having a single fiber fineness of 3.46 dtex and which have a total fineness of 470 dtex, a strength of 8.5 cN/dtex, and a degree of elongation of 23%. From these synthetic fiber filaments, a woven fabric was woven so that the density of each of the warp and weft yarns would be 50 yarns per 2.54 cm. A surface of the woven fabric was coated with a solventless silicone resin having a viscosity of 50 Pa·s (50,000 cP) so that the amount of the attached resin would be 25 g/m$^2$, and a base fabric for a main body having a basis weight of 230 g/m$^2$ and a thickness of 0.33 mm was obtained.

(2) Evaluation of Results of Inflation Test

The test was performed in the foregoing manner, and evaluations were made as follows: in the case where only the first coated fabric in contact with the inflator was damaged, the result was evaluated as "E" (excellent); in the case where the flame penetrated the first coated fabric and the second coated fabric was also damaged but the fabric for an air-bag main body was not damaged, the result was evaluated as "G" (good); and in the case where the flame penetrated the second coated fabric and the fabric for an air-bag main body was also damaged, the result was evaluated as "P" (poor).

Example 1

(Warp Yarn and Weft Yarn)

Warp and weft yarns used were twistless synthetic fiber filaments which are constituted of 72 nylon 66 filaments having a circular cross section and having a single fiber fineness of 6.53 dtex and which have a total fineness of 470 dtex, a strength of 8.5 cN/dtex, and, a degree of elongation of 23%.

(Weaving Step)

From the warp and weft yarns, a four-layer woven fabric in which the density of the warp yarn was 145 yarns per 2.54 cm and the density of the weft yarn was 105 yarns per 2.54 cm was woven with the use of a dobby loom. In the weaving, the warp yarn tension was controlled to 35 cN per yarn and the loom speed was 450 rpm.

(Scouring and Setting Step)

Next, the woven fabric was scoured and dried by a usual method, and was subsequently heat-set at 160° C. for 1 minute with the use of a pin tenter dryer under dimensional restraint at a widthwise shrinkage rate of 0% and an overfeed rate of 0%.

(Coating Step)

Next, the front surface of the woven fabric was coated with a solventless addition-type silicone resin having a viscosity of 50 Pa·s (50,000 cP) with a roll comma coater so that the amount of the attached resin would be 240 g/m$^2$, and thereafter was subjected to vulcanization at 190° C. for 1 minute. After that, the back surface of the woven fabric was coated with the same resin so that the amount of the attached resin would be 60 g/m$^2$, and thereafter subjected to vulcanization at 190° C., for 1 minute. In this way, a coated fabric was obtained.

The void content of the obtained coated fabric was measured and found to be 23%. The results obtained by measuring the woven fabric thickness and basis weight are shown in Table 1. The result of an inflation test on the coated fabric is shown in Table 1. As shown in Table 1, the coated fabric was highly heat-resistant.

Example 2

(Warp Yarn and Weft Yarn)

The Same Synthetic Fiber Filaments as in Example 1 were used as warp and weft yarns.

(Weaving Step)

From the warp and weft yarns, a four-layer woven fabric in which the density of the warp yarn was 145 yarns'per 2.54 cm and the density of the weft yarn was 200 yarns per 2.54 cm was woven with the use of a dobby loom. In the weaving, the warp yarn tension was controlled to 35 cN per yarn and the loom speed was 450 rpm.

(Scouring and Setting Step)

Next, the woven fabric was subjected to the same scouring and setting as in Example 1.

(Coating Step)

Next, the front surface of the woven fabric was coated with a solventless addition-type silicone resin having a viscosity of 20 Pa·s (20,000 cP) with a roll comma coater so that the amount attached to the woven fabric would be 200 g/m$^2$, and thereafter was subjected to vulcanization at 190° C. for 1 minute. After that, the back surface of the woven fabric was coated with the same resin so that the amount of the attached resin would be 50 g/m$^2$, and thereafter subjected to vulcanization at 190° C. for 1 minute. In this way, a coated fabric was obtained.

The void content of the obtained coated fabric was measured and found to be 15%. The result of an inflation test on the coated fabric is shown in Table 1. As shown in Table 1, the coated fabric was highly heat-resistant.

Example 3

(Warp Yarn and Weft Yarn)

Warp and weft-yarns used were twistless synthetic fiber filaments which are constituted of 72 nylon 66 filaments having a circular cross section and having a single fiber fineness of 4.86 dtex and which have a total fineness of 350 dtex, a strength of 8:5 cN/dtex, and a degree of elongation of 23.4%.

(Weaving Step)

From the warp and weft yarns, a four-layer woven fabric in which the density of the warp yarn was 165 yarns per 2.54 cm and the density of the weft yarn was 120 yarns per 2.54 cm was woven with the use of a dobby loom. In the weaving, the warp yarn tension was controlled to 35 cN per yarn and the loom speed was 450 rpm.

(Scouring and Setting Step)

Next, the woven fabric was subjected to the same scouring and setting as in Example 1.

(Coating Step)

Next, the front surface of the woven fabric was coated with a solventless addition-type silicone resin having a viscosity of 20 Pa's (20,000 cP) with a roll comma coater so that the amount of the attached resin would be 250 g/m$^2$, and thereafter was subjected to vulcanization at 190° C. for 1 minute. After that, the back surface of the woven fabric was coated with the same resin so that the amount of the attached resin would be 50 g/m$^2$, and thereafter subjected to vulcanization at 190° C. for 1 minute. In this way, a coated fabric was obtained.

The void content of the obtained coated fabric was measured and found to be 36%. The result of an inflation test on the coated fabric is shown in Table 1. As shown in Table 1, the coated fabric was highly heat-resistant.

Example 4

(Warp Yarn and Weft Yarn)

The same synthetic fiber filaments as in Example 3 were used as warp and weft yarns.

(Weaving Step)

From the warp, and weft yarns, a four-layer woven fabric in which the density of the warp yarn was 165 yarns per 2.54 cm and the density of the weft yarn was 120 yarns per 2.54 cm was woven with the use of a dobby loom. In the weaving, the warp yarn tension was controlled to 35 cN per yarn and the loom speed was 450 rpm.

(Scouring and Setting Step)

Next, the woven fabric was subjected to the same scouring and setting as in Example 1.

(Coating Step)

Next, the front surface of the woven fabric was coated with a solventless addition-type-silicone resin having a viscosity of 50 Pa·s (50,000 cP) with a roll comma coater so that the amount of the attached resin would be 300 g/m$^2$, and thereafter was subjected to vulcanization at 190° C. for 1 minute. In this way, a coated fabric was obtained.

The void content of the obtained coated fabric for an air-bag was calculated and found to be 34%. The result of an inflation test on the coated fabric for an air-bag is shown in Table 1. As shown in Table 1, the coated fabric was highly heat-resistant.

Example 5

(Warp Yarn and Weft Yarn)

Warp and weft yarns used were twistless synthetic fiber filaments which are constituted of 96 polyethylene terephthalate filaments having a circular cross section and having a single fiber fineness of 5.83 dtex and which have a total fineness of 560 dtex, a strength of 7.5 cN/dtex, and a degree of elongation of 20%.

(Weaving Step)

From the warp and weft yarns, a four-layer woven fabric in which the density of the warp yarn was 140 yarns per 2.54 cm and the density of the weft yarn was 100 yarns per 2.54 cm was woven with the use of a dobby loom. In the weaving, the warp yarn tension was controlled to 35 cN per yarn and the loom speed was 450 rpm.

(Scouring and Setting Step)

Next, the woven fabric was subjected to the same scouring and setting as in Example 1.

(Coating Step)

Next, the front surface of the woven fabric was coated with a solventless addition-type silicone resin having a viscosity of 50 Pa·s (50,000 cP) with a roll comma coater so that the amount of the attached resin would be 200 g/m$^2$, and thereafter was subjected to vulcanization at 190° C. for 1 minute. After that, the back surface of the woven fabric was coated with the same resin so that the amount of the attached resin would be 100 g/m$^2$, and thereafter subjected to vulcanization at 190° C. for 1 minute. In this way, a coated fabric was obtained.

The void content of the obtained coated fabric was calculated and found to be 25%. The result of an inflation test on the coated fabric for an air-bag is shown in Table 1. As shown in Table 1, the coated fabric was highly heat-resistant.

Example 6

(Warp Yarn and Weft Yarn)

The same synthetic fiber filaments as in Example 1 were used as warp and weft yarns.

(Weaving Step)

From the warp and weft yarns, a three-layer woven fabric in which the density of the warp yarn was 100 yarns per 2.54 cm and the density of the weft yarn was 92 yarns per 2.54 cm was woven with the use of a dobby loom. In the weaving, the warp yarn tension was controlled to 35 cN per yarn and the loom speed was 450 rpm.

(Scouring and Setting Step)

Next, the woven fabric was subjected to the same scouring and setting as in Example 1.

(Coating Step)

Next, the front surface of the woven fabric was coated with a solventless silicone resin having a viscosity of 50 Pa·s (50,000 cP) with a roll comma coater so that the amount of the attached resin would be 200 g/m$^2$, and thereafter was subjected to vulcanization at 190° C. for 1 minute. After that, the back surface of the woven fabric was coated with the same resin so that the amount of the attached resin would be 50 g/m$^2$, and thereafter subjected to vulcanization at 190° C. for 1 minute. In this way, a coated fabric was obtained.

The void content of the obtained coated fabric was calculated and found to be 17%. The result of an inflation test on the coated fabric is shown in Table 2. As shown in Table 2, as for this coated fabric, although the flame penetrated the first coated fabric and the second coated fabric was also damaged, the fabric for an air-bag main body was not affected.

Example 7

(Warp Yarn and Weft Yarn)

The same synthetic fiber filaments as in Example 1 were used as warp and weft yarns.

(Weaving Step)

From the warp and weft yarns, a four-layer woven fabric in which the density of the warp Yarn was 120 yarns per 2.54 cm and the density of the weft yarn was 90 yarns per 2.54 cm was woven with the use of a dobby loom. In the weaving, the warp yarn tension was controlled to 35 cN per yarn and the loom speed was 450 rpm.

(Scouring and Setting Step)

Next, the woven fabric was subjected to the same scouring and setting as in Example 1.

(Coating Step)

Next, the front surface of the woven fabric was coated with a solventless addition-type silicone resin having a viscosity of 50 Pa·s (50,000 cP) with a roll comma coater so that the amount of the attached resin would be 500 g/m$^2$, and thereafter was subjected to vulcanization at 190° C. for 1 minute. After that, the back surface of the woven fabric was coated with the same resin so that the amount of the attached resin would be 100 g/m$^2$, and thereafter subjected to vulcanization at 190° C. for 1 minute. In this way, a coated fabric was obtained.

The void content of the obtained coated fabric for an air-bag was calculated and found to be 15%. The result of an inflation test on the coated fabric is shown in Table 2. As shown in Table 2, the coated fabric was highly heat-resistant.

Comparative Example 1

(Warp Yarn and Weft Yarn)

The same synthetic fiber filaments as in Example 1 were used as warp and weft yarns.

(Weaving Step)

From the warp and weft yarns, a three-layer woven fabric in which the density of the warp yarn was 92 yarns per 2.54 cm and the density of the weft yarn was 92 yarns per 2.54 cm was woven with the use of a dobby loom. In the weaving, the warp yarn tension was controlled to 35 cN per yarn and the loom speed was 450 rpm.

(Scouring and Setting Step)

Next, the woven fabric was subjected to the same scouring and setting as in Example 1.

(Coating Step)

Next, the front surface of the woven fabric was coated with a solventless silicone resin having a viscosity of 50 Pa·s (50,000 cP) with a roll comma coater so that the amount of the attached resin (surface coating amount) would be 240 g/m$^2$ and thereafter was subjected to vulcanization at 190° C. for 1 minute. After that, the back surface of the woven fabric was coated with the same resin so that the amount would be 60 g/m$^2$, and thereafter subjected to vulcanization at 190° C. for 1 minute. In this way, a coated fabric was obtained.

The void content of the obtained coated fabric was calculated and found to be 6%. The result of an inflation test on the coated fabric is shown in Table 2. As shown in Table 2, as for this coated fabric, the flame penetrated the stack of two coated fabrics and the fabric for an air-bag main body was also damaged.

Comparative Example 2

(Warp Yarn and Weft Yarn)

The same synthetic fiber filaments as in Example 3 were used as warp and weft yarns.

(Weaving Step)

From the warp and weft yarns, a four-layer woven fabric in which the density of the warp yarn was 165 yarns per 2.54 cm and the density of the weft yarn was 120 yarns per 2.54 cm was woven with the use of a dobby loom. In the weaving, the warp yarn tension was controlled to 35 cN per yarn and the loom speed was 450 rpm.

(Scouring and Setting Step)

Next, the woven fabric was subjected to the same scouring and setting as in Example 1.

(Coating Step)

Next, the front surface of the woven fabric was coated with a solventless silicone resin having a viscosity of 20 Pa·s (20,000 cP) with a roll comma coater so that the amount of the attached resin would be 40 g/m$^2$, and thereafter was subjected to vulcanization at 190° C. for 1 minute. In this way, a coated fabric was obtained.

The void content of the obtained coated fabric was calculated and found to be 32%. The result of an inflation test on the coated fabric for an air-bag is shown in Table 2. As shown in Table 2, as for this coated fabric, the flame penetrated the stack of two coated fabrics and the fabric for an air-bag main body was also damaged.

Comparative Example 3

(Warp Yarn and Weft Yarn)

The same synthetic fiber filaments as in Example 5 were used as warp and weft yarns.

(Weaving Step)

From the warp and weft yarns, a three-layer woven fabric in which the density of the warp yarn was 100 yarns per 2.54 cm and the density of the weft yarn was 100 yarns per 2.54 cm was woven with the use of a dobby loom. In the weaving, the warp yarn tension was controlled to 35 cN per yarn and the loom speed was 450 rpm.

(Scouring and Setting Step)

Next, the woven fabric was subjected to the same scouring and setting as in Example 1.

(Coating Step)

Next, the front surface of the woven fabric was coated with a solventless silicone resin having a viscosity of 50 Pa·s (50,000 cP) with a roll comma coater so that the amount of the resin attached to the surface would be 10.0 g/m², and thereafter was subjected to vulcanization at 190° C. for 1 minute. After that, the back surface of the woven fabric was coated with the same resin so that the amount of the attached resin would be 100 g/m², and thereafter subjected to vulcanization at 190° C. for 1 minute. In this way, a coated fabric for an air-bag was obtained.

The void content of the obtained coated fabric for an air-bag was calculated and found to be 12%. The result of an inflation test on the coated fabric for an air-bag, which serves as a heat-resistant fabric, is shown in Table 2. As shown in Table 2, as for this coated fabric for an air-bag, the flame penetrated the stack of two coated fabrics and the fabric for an air-bag main body was also damaged.

TABLE 1

|  | Unit | Example 1 | Example 2 | Example 3 | Example 4 | Example 5 |
|---|---|---|---|---|---|---|
| Synthetic fiber |  | Nylon 66 | Nylon 66 | Nylon 66 | Nylon 66 | Polyethylene telephtalate |
| Total fineness | dtex | 470 | 470 | 350 | 350 | 560 |
| Single yarn fineness | dtex | 6.53 | 6.53 | 4.86 | 4.86 | 5.83 |
| The number of filaments | f | 72 | 72 | 72 | 72 | 96 |
| Strength | cN/dtex | 8.5 | 8.5 | 8.5 | 8.5 | 7.5 |
| Degree of elongation | % | 23 | 23 | 23.4 | 23.4 | 20 |
| Density of warp yarns | Yarns per 2.54 cm | 145 | 145 | 165 | 165 | 140 |
| Density of weft yarns | Yarns per 2.54 cm | 105 | 200 | 120 | 120 | 100 |
| Warp yarn tension at weaving | cN/yarn | 35 | 35 | 35 | 35 | 35 |
| Loom speed | rpm | 450 | 450 | 450 | 450 | 450 |
| Viscosity of resin | Pa·s | 50 | 20 | 20 | 50 | 50 |
| Woven fabric thickness | mm | 1.37 | 1.32 | 1.18 | 1.16 | 1.35 |
| Basis weight | g/m² | 945 | 873 | 797 | 780 | 956 |
| Amount of resin attached to front surface | g/m² | 240 | 200 | 250 | 300 | 200 |
| Amount of resin attached to back surface | g/m² | 60 | 50 | 50 | 0 | 100 |
| Void content | % | 23 | 15 | 36 | 34 | 25 |
| Result of an inflation test |  | E | E | E | E | E |

TABLE 2

|  | Unit | Example 6 | Example 7 | Comparative Example 1 | Comparative Example 2 | Comparative Example 3 |
|---|---|---|---|---|---|---|
| Synthetic fiber |  | Nylon 66 | Nylon 66 | Nylon 66 | Nylon 66 | Polyethylene telephtalate |
| Total fineness | dtex | 470 | 470 | 470 | 350 | 560 |
| Single yarn fineness | dtex | 6.53 | 6.53 | 6.53 | 4.86 | 5.83 |
| The number of filaments | f | 72 | 72 | 72 | 72 | 96 |
| Strength | cN/dtex | 8.5 | 8.5 | 8.5 | 8.5 | 7.5 |
| Degree of elongation | % | 23 | 23 | 23 | 23.4 | 20 |
| Density of warp yarns | Yarns per 2.54 cm | 100 | 120 | 92 | 165 | 100 |
| Density of weft yarns | Yarns per 2.54 cm | 92 | 90 | 92 | 120 | 100 |
| Warp yarn tension at weaving | cN/yarn | 35 | 35 | 35 | 35 | 35 |
| Loom speed | rpm | 450 | 450 | 450 | 450 | 450 |
| Viscosity of resin | Pa·s | 50 | 50 | 50 | 20 | 50 |
| Woven fabric thickness | mm | 1.2 | 1.55 | 1.02 | 0.93 | 1.06 |
| Basis weight | g/m² | 841 | 1058 | 715 | 576 | 829 |
| Amount of resin attached to front surface | g/m² | 200 | 500 | 240 | 40 | 100 |
| Amount of resin attached to back surface | g/m² | 50 | 100 | 60 | 0 | 100 |

TABLE 2-continued

| | Unit | Example 6 | Example 7 | Comparative Example 1 | Comparative Example 2 | Comparative Example 3 |
|---|---|---|---|---|---|---|
| Void content | % | 17 | 15 | 6 | 32 | 12 |
| Result of an inflation test | | G | E | P | P | P |

INDUSTRIAL APPLICABILITY

A coated fabric of the present invention is suitable for use as a base fabric for an air-bag which can reduce damage to an air-bag main body fabric from a hot gas generated from an inflator.

DESCRIPTION OF REFERENCE SIGNS

1: Coated fabric
2: Three dimensional construction woven fabric
3: Fiber
4: Elastomer resin
5: Void.
10: Inflator
11: Exit gas port
12: Fabric for air-bag main body
13: Coated fabric

The invention claimed is:

1. A coated fabric comprising a three dimensional construction woven fabric which is selected from a three-layer woven fabric and a four-layer woven fabric, wherein:
   at least one surface of the three dimensional construction woven fabric is coated with an elastomer resin layer,
   the elastomer resin layer is coated in an amount of 50 to 500 g/m² per one surface; and
   the coated fabric has voids therein and has a void content of 15 to 60%, calculated as:

Void content (%)=(Apparent mass−Actual mass)/(Actual mass)×100; and

Apparent mass(g)=(Thickness of uncoated base fabric(cm))×(Area of test piece(cm²))×(Density of original yarn(g/cm³))+((Thickness of coated base fabric(cm))−(Thickness of uncoated base fabric(cm)))×(Area of test piece(cm²))×(Density of resin(g/cm³)).

2. An airbag that includes a coated fabric according claim 1.

3. An airbag that includes a coated fabric according to claim 1 as an attachment to a periphery of an inflator connection opening in the air-bag.

4. The coated fabric for an air-bag according to claim 1, wherein:
   fibers constituting the three dimensional construction woven fabric are synthetic fibers; and
   the fibers have a total fineness of 100 to 700 dtex and a single yarn fineness of 1 to 7 dtex.

5. The coated fabric according to claim 1, wherein:
   both surfaces of the three dimensional construction woven fabric are each coated with the elastomer resin layer; and
   the amount of the elastomer resin layer attached to one of the both surfaces is equal to or less than 200 g/m².

6. The coated fabric according to claim 1, wherein the three dimensional construction woven fabric has a thickness of 0.5 to 2.5 mm, measured in accordance with JIS L 1096:1999 8.5.

7. A method for producing the coated fabric recited in claim 1, comprising:
   producing a three dimensional construction woven fabric from synthetic fibers with a jacquard loom or a dobby loom; and
   coating at least one surface of the three dimensional construction woven fabric with an elastomer resin.

8. An air-bag comprising the coated fabric recited in claim 1, wherein the coated fabric is sewed to a part for attachment to a periphery of an opening for connection with an inflator of an air-bag device.

* * * * *